UNITED STATES PATENT OFFICE.

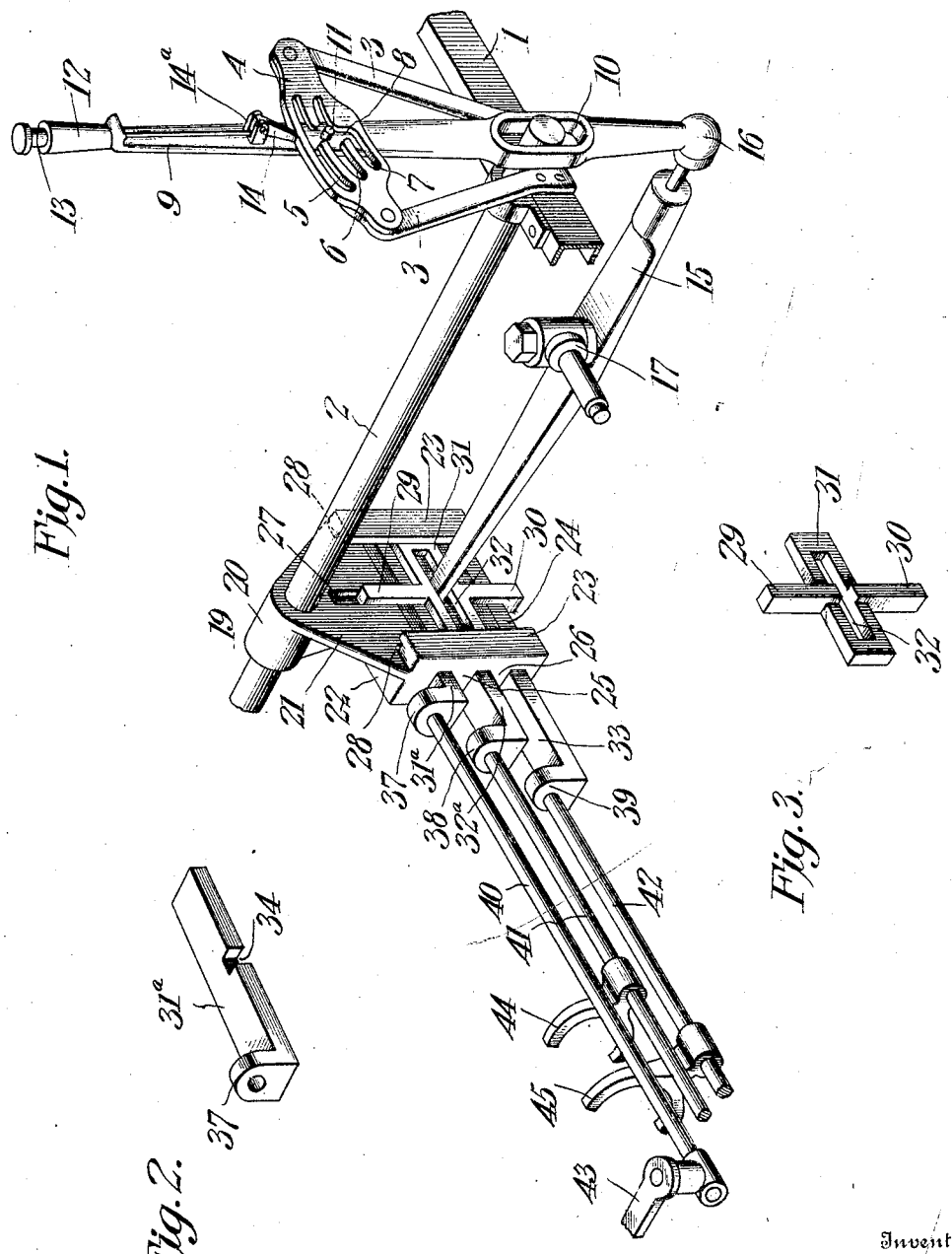

CHARLES L. RAYFIELD, OF SOUTH BEND, INDIANA.

GEAR-SHIFTER.

No. 929,012.      Specification of Letters Patent.      Patented July 27, 1909.

Application filed June 26, 1907. Serial No. 380,866.

*To all whom it may concern:*

Be it known that I, CHARLES L. RAYFIELD, a citizen of the United States, residing at South Bend, in the county of St. Joseph and State of Indiana, have invented certain new and useful Improvements in Gear-Shifters, of which the following is a specification.

The present invention consists of certain new and useful improvements in gear shifting mechanism, and has particular relation to the class of gear shifting mechanism known as the selective type.

One of the principal objects of the invention is to provide a new form of operating mechanism, whereby the entire operation of shifting the various gears for varying degrees of speed, and for forward or reverse movement, may be performed by means of one controlling lever.

Another object is to arrange and locate the shifting mechanism in such a position that it will be protected from mud or other clogging substances.

Another object is in the arrangement of horizontal slides for shifting the various gears, combined with a vertically movable locking mechanism, the said locking mechanism being provided with means that will engage with and immovably hold all the slides in an inoperative position excepting the one that is being moved.

Another object is to provide an improved form of slotted guide plate for the controlling lever combined with means for retaining said lever in engagement with the desired portion of said slotted plate.

Another object is the provision of a shifting lever having a swiveled connection with a suitable support, one end of said shifting lever being in engagement with the lower end of the controlling lever, its other end being adapted to engage with and operate any one of the gear shifting slides and at the same time cause a locking mechanism to engage with and retain in an inoperative position the slides that are not to be shifted.

With these and other objects in view, the invention comprises certain details of construction and combinations of parts described in detail in the following description, pointed out in the appended claims, and illustrated in the accompanying drawings.

Of the accompanying drawings wherein like characters of reference refer to corresponding parts,—Figure 1 is a perspective view of the gear shifting mechanism. Fig. 2 is a detail view of one of the gear shifting slides. Fig. 3 is a perspective view of the locking bar.

In the accompanying drawings I have illustrated only such part of the invention as is necessary to explain fully the details and operation thereof, the arrangement of the various gear wheels not being essential to the present invention, the same have been omitted.

Referring to Figure 1 of the drawings, 1 designates conventionally, a frame or the like, which forms a supporting means for a bar 2, one end of which is projected beyond the side of said frame. Adjacent to the projected end of said bar, and supported upon said frame are two upwardly extending diverging arms 3, the upper ends of which support a guide plate 4. The guide plate is provided with horizontal slots 5, 6 and 7, which are in communication with one another by means of a vertical, central, slot 8. A controlling lever 9 has its lower end provided with one member of a ball and socket and pin connection (16), the object of which will be presently described. Intermediate the said lower end and its handle 12, the lever 9 is provided with an elongated slot or bearing 10 for the projected end of the bar 2, which forms a means whereby the said lever may have a horizontal movement and also be capable of being moved vertically. A guide pin 11 is provided on the lever 9, and is located so as to be in a position to be placed within the slots 5, 6, 7 or 8 of the guide plate 4. The function of this pin will be more fully set forth later. The upper end of the lever 9 is provided with a hollow hand grip or handle 12, through which slides a vertically arranged push lever 13, the lower end of which is connected with a stop 14, made in the form of a bell crank lever. This stop 14 has a pivotal connection with the lever 9 by means of the lugs 14'. A shifting lever 15 has one of its ends connected to the lower end of the lever 9 by means of a ball and socket and pin connection 16, and its intermediate portion has a swiveled connection 17 with the supporting frame 1. The opposite end of said shifting lever is adapted to shift the gear slides and the locking mechanism, as will be described later. The bar 2 at the end opposite to that which supports the controlling lever 9, has depending therefrom a casting which forms a supporting frame 19. Said frame 19 comprises a sleeve 20, mounted on the bar 2 from which depends a wing 21, terminating in a flat horizontal top or cover 22. 23—23 are vertical standards upon the inner edge of each end of the top or cover 22, and 24 designates a flat horizontal bottom. The space within the frame between the top or cover 22 and bottom 24 is sub-divided into three compartments by means of the horizontal members 25—26. The inner edges of each of the four horizontal members of the frame, that is, the top or cover, the dividing members, and the bottom, are each provided with a central slot, and the wing is also provided with a slot, and as these slots all aline with one another, a slot or guideway 27 is formed the entire length of the frame. The inner edges of the vertical standards are formed with a guideway 28—28, in which is slidingly mounted a cross-shaped locking bar. Said locking bar comprises an upper vertical member 29, a lower vertical member 30, and a horizontal member 31. The central portion of the horizontal member is provided with a horizontal slot 32. The members 29—30 are of a size to permit of their being freely reciprocated within the slot or guideway 27, and the ends of the horizontal member 31 are of a size to permit of their being freely reciprocated within the guide ways 28—28 of the vertical standards 23—23. Within each of the compartments of the supporting frame 19 are arranged the slides $31^a$, $32^a$ and 33. These slides are each provided with a slot 34, formed in their edges, the said slots being arranged to be in alinement with the slot or guideway 27 of the frame 19. The outer ends of each slide is provided with an upturned portion 37, 38 and 39, from which extends the rods 40, 41 and 42, carrying the gear shifters 43, 44 and 45. The end of the shifting lever 15 opposite to that which is connected with the lower end of the controlling lever 9, is reduced in thickness so as to be of such a size as will permit of its being freely passed through the central slot 32 of the locking slide, and to enter into the guideway 27 of the frame and the slots in the slides $31^a$, $32^a$ and 33. And owing to the length of the slot 32, the said end of the lever 15 may be moved horizontally therein.

The operation of the invention is as follows:—Assume the device to be in the position shown in Fig. 1, the controlling lever 9 being in the vertical position and having the pin within the vertical slot 8 of the guide plate 4, at the entrance to the horizontal slot 6, the starting lever being held in such position by means of the stop 14 being in engagement with the top of the guide plate. When in this position it will be seen that the shifting lever 15 will be in practically a horizontal plane, with its inner end within the slot of the slide $32^a$. To shift the gears controlled by said slide, lever 9 is shifted to the right or left (according to the degree of speed desired) which imparts a left or right movement to the shifting lever 15 and thereby causes a right or left movement of the slide $32^a$ by means of the engagement between the end of lever 15 and the slot in the edge of the said slide. To shift from slide $32^a$ to slide $31^a$, the controlling lever 9 is brought to its vertical position with its pin in the central slot 8, the stop 14 thrown out of engagement with the top of guide plate 4 by means of a downward pressure on push lever 13, whereupon lever 9, by means of its slotted bearing may be depressed, which raises the shift end of lever 15 in the slot or guideway 27, carrying with it the locking slide. When the controlling lever has been pushed down to its lower position the pin rests within the lower slot 7 of the guide plate and the shift end of lever 15 will be in the slot 34 of the slide $31^a$. When in this position the lower vertical member of the locking slide will be in engagement with the slots in the bottom of the frame, the lower slide, the lower dividing member, the intermediate slide, and the upper dividing member. The central slot of the locking slide will be in alinement with the slotted edge of slide $31^a$. The upper vertical portion of the slide will be within the slot of the top or cover and the wing of the frame. It will therefore be seen that the two lower slides are held immovable, while by a shift of lever 9 to the left, through its connection with lever 15, will impart a corresponding movement to slide $31^a$. To shift the slide 33 (the lower one), controlling lever 9 is brought back to the central slot 8, (which of course returns slide $31^a$ to its original position) and lifted up until its pin contacts with the upper end of the slot 8. This lifting movement depresses the shift end of lever 15, carrying with it the locking slide, until the slot in the locking slide alines with the slot in slide 33. In this position, the upper vertical member of the locking slide is in engagement with the slots in the upper slides and also the cover and dividing members, and thereby retain said upper slides in position. A shift to the right or left of lever 9 will through the lever 15, impart a corresponding ing movement to the slide 33.

It will be understood that by the peculiar arrangement of the horizontal slots and the vertical connecting slot of the guide plate 4, that said guide plate to all intent and purposes serves as an indicator by means of which the degree of speed of the transmission may be readily estimated. For instance, if the pin of lever 9 is in the upper horizontal slot 5, and at the extreme right thereof, it will be readily understood by the operator that he lower gear shifting slide 33 is in its first position, and that the transmission is running at its first speed. If to the extreme left in said slot the second speed is being obtained. If at the center where said slot forms a junction with the central vertical slot 8, the gears contr... are in an inoperative, or disengaged, position. When the pin is at the right of the intermediate horizontal slot 6, it will be understood that slide 32ª (the intermediate slide) is in the 3rd position and that the transmission is running at the third speed. If at the left, the slide is in its 4th position and the transmission is running at the 4th speed, and as in the first instance, the middle position, or junction of said slot with the central vertical slot 8, would indicate that the gears are disengaged. If the pin is in the lower slot 7, which is a short one, it being only of the length of the left portions of slots 6 and 7 and terminates in the vertical central slot 8, it will be understood that the upper slide 31 is in the fifth position and that the transmission is running at the fifth speed, which in this case happens to be the reverse. This indicating feature will be further appreciated from the fact that the guide plate is located in a position where it can be readily seen by the operator.

In the foregoing description and in the drawings I have illustrated and described the preferred embodiment of my invention, yet I wish it to be understood that I reserve for myself any and all variations thereof such as fall within the spirit and scope of the appended claims.

I claim as my invention:—

1. A gear shifting mechanism comprising a pivoted fulcrum block, an operating lever pivoted to said block in such manner as to move independently of the pivotal movement of the block, parallel gear-controlling slides adapted to be engaged by one end of said lever and operated selectively by the latter, and a longitudinally movable hand lever engaging said operating lever.

2. A gear shifting mechanism comprising a pivoted fulcrum block, an operating lever pivoted to said block in such manner as to move independently of the pivotal movement of the block, parallel gear-controlling slides adapted to be engaged by one end of said lever, and a longitudinally movable hand lever for moving said fulcrum block on its pivot, whereby said lever may be caused to engage any one of said slides.

3. A gear shifting mechanism comprising a pivoted fulcrum block, an operating lever pivoted to said block in such manner as to move independently of the pivotal movement of the block, parallel gear-controlling slides adapted to be engaged by one end of said lever, means supported by said lever for locking the slides that are not in engagement with the lever, and a longitudinally movable hand lever engaging said operating lever.

4. A gear shifting mechanism comprising a pivoted fulcrum block, a lever pivoted to said block in such manner as to move independently of the pivotal movement of said block, gear controlling sides arranged to be engaged by one end of said lever, adapted to be independently operated by the latter, and a locking slide supported by said lever and adapted to engage the gear controlling slides.

5. A gear shifting mechanism comprising a pivoted fulcrum block, a lever pivoted to said block in such manner as to move independently of the pivotal movement of said block, gear controlling slides selectively operated by said lever, and a locking slide loosely supported upon one end of said lever and adapted to engage said gear controlling slides, said locking slide and said lever being capable of independent movement.

6. A gear shifting mechanism comprising a longitudinally movable controlling lever, a shifting lever connected thereto, said shifting lever being mounted to have a vertical or horizontal movement, gear shifting slides adapted to be independently and selectively engaged and shifted by said shifting lever, and a vertically arranged locking slide adapted to lock the slides that are not being shifted.

7. A gear shifting mechanism comprising a longitudinally movable controlling lever, a slotted guide plate therefor, a shifting lever having a connection with said controlling lever, a supporting frame, a plurality of horizontally arranged slides mounted therein, and a locking bar adapted to have an engagement with the slides that are not to be shifted.

8. A gear shifting mechanism comprising a controlling lever, a guide plate, means for retaining said lever in a predetermined position relatively to said guide plate, a shifting lever connected with said controlling lever, a supporting frame, gear shifting slides mounted therein, said slides having an opening formed in their edges, a locking slide mounted to have a vertical movement within said frame, said locking slide being provided with a central slot through which the end of the shifting lever is extended to engage selectively and independently any one of the slides.

9. A gear shifting mechanism comprising a controlling lever, a slotted guide plate, means carried by said controlling lever for entering the slotted portion of said guide plate, means for retaining said controlling lever in a predetermined position relatively to the slotted portion of said guide plate, a shifting lever connected with said controlling lever, gear shifting slides adapted to be independently and selectively shifted by said shifting lever, and locking mechanism for engaging with the slides that are not being shifted.

10. A gear shifting mechanism comprising a controlling lever, a slotted guide plate, a pin carried by said lever adapted to enter the slotted portion of said guide plate, a shifting lever connected with said controlling lever, shifting slides adapted to be independently and selectively shifted by said shifting lever, and vertically arranged locking mechanism for retaining in position the slides that are not to be shifted.

11. A gear shifting mechanism comprising a controlling lever mounted to have a pivotal and vertical movement, a slotted guide plate, a pin carried by said controlling lever adapted to enter the slotted portion of said guide plate, a shifting lever connected with said controlling lever, gear shifting slides adapted to be independently and selectively shifted by said lever, and a vertically movable locking bar adapted to engage with the slides that are not to be shifted.

12. A gear shifting mechanism comprising a controlling lever mounted to have a pivotal and vertical movement, a slotted guide plate, a pin carried by said controlling lever adapted to enter the slotted portion of said guide plate, a shifting lever, a supporting frame, a plurality of gear shifting slides mounted in said frame, a locking bar vertically movable in said frame, the said locking bar being adapted to engage with the slides that are not to be shifted.

13. A gear shifting mechanism comprising a supporting frame, a plurality of gear shifting slides arranged on different horizontal planes mounted to have a horizontal movement in said frame, a shifting lever, a locking bar carried by one end thereof, means carried by said frame for guiding said bar, and means for imparting vertical and horizontal movements to said shifting lever, for selectively and independently shifting any one of said slides.

14. A gear shifting mechanism comprising a supporting frame divided into a plurality of compartments on different horizontal planes, a horizontally movable gear shifting slide in each compartment, a shifting lever, a locking bar carried by one end thereof, means carried by said frame for guiding said bar, and means for imparting vertical and horizontal movements to said shifting lever, for selectively and independently shifting any one of said slides.

15. A gear shifting mechanism comprising a frame divided into compartments, gear shifting slides arranged to have a horizontal movement in said compartments, the edge of each of said slides being provided with an opening which normally alines with similar openings formed on the edges of the frame members, a locking slide provided with a central horizontal slot, the said slot being adapted to register with the openings in any of the slides, and a shifting lever adapted to enter the slot of the locking slide and selectively and independently engage with any one of the slides, and at the same time cause the said locking bar to engage with the slides that are not engaged with the said shifting lever.

16. A gear shifting mechanism comprising a frame divided into compartments, a gear shifting slide mounted to have a horizontal movement in each of said compartments, the edges of each of said slides and the members of the supporting frame being provided with openings which normally aline with one another, a vertically movable locking bar having portions that engage with and slide in said openings formed in the edges of the frame members and the slides, the said locking bar being provided with a central horizontal slot, and a shifting lever which enters the slot in the locking bar and engages with any one of said slides selectively and independently and at the same time causes the locking bar to move to a position where it will engage with and lock the slides that are not being shifted.

17. A gear shifting mechanism consisting of a pivotally mounted controlling lever provided with a projecting pin, said lever having an adjustable connection with its fulcrum, a guide plate provided with horizontal slots and a vertical connecting slot, gear shifting slides, means operated by said controlling lever for independently and selectively engaging and shifting any one of said slides, and a locking mechanism adapted to lock the slides that are not being shifted.

18. A gear shifting mechanism consisting of a controlling lever mounted to have a vertical and a pivotal movement, a pin projecting therefrom, a guide plate provided with horizontal slots and a vertical connecting slot, the said pin being adapted to be selectively placed in any of said slots, gear shifting slides corresponding in number to the number of horizontal slots in the guide plate, a shifting lever having one end connected to the controlling lever, its other end being adapted to engage with and shift one of said slides selectively and independently, the slide to be shifted being governed by the horizontal slot in which said pin is, and a locking device adapted to be moved to a position to lock the slides that are not to be shifted when the shifting lever is caused to engage with the slide that is to be shifted.

In testimony whereof I affix my signature, in presence of two witnesses.

CHAS. L. RAYFIELD.

Witnesses:
 THOS. L. TINCHU,
 JAS. C. JOHNSON.